United States Patent
Gagliardi et al.

(10) Patent No.: US 6,495,261 B1
(45) Date of Patent: Dec. 17, 2002

(54) GLAZING PANELS

(75) Inventors: Giovanni Gagliardi, S. Patrizio di Conselice (IT); Sergio Castellano, Vasto (IT)

(73) Assignee: Societa Italiana Vetro - SIV - S.p.A, San Salvo (IT)

( * ) Notice: Subject to any disclaimer, the term of this patent is extended or adjusted under 35 U.S.C. 154(b) by 0 days.

(21) Appl. No.: 09/830,404

(22) PCT Filed: Oct. 28, 1999

(86) PCT No.: PCT/IB99/01786

§ 371 (c)(1), (2), (4) Date: Jul. 2, 2001

(87) PCT Pub. No.: WO00/26023

PCT Pub. Date: May 11, 2000

(30) Foreign Application Priority Data

Oct. 30, 1998 (EP) .............................. 98830664

(51) Int. Cl.⁷ .............................................. B32B 17/06
(52) U.S. Cl. ................... 428/426; 296/84.1; 296/190.1
(58) Field of Search .......................... 296/190.1, 84.1; 428/426

(56) References Cited

U.S. PATENT DOCUMENTS

| | | | |
|---|---|---|---|
| 4,644,139 A | * | 2/1987 | Harrison et al. ......... 156/273.9 |
| 4,898,789 A | * | 2/1990 | Finley ......................... 428/432 |
| 5,132,161 A | * | 7/1992 | Shibata et al. .............. 343/704 |
| 5,162,145 A | * | 11/1992 | Schaefer ..................... 359/270 |
| 5,492,750 A | | 2/1996 | Shumaker, Jr. et al. |
| 5,620,799 A | * | 4/1997 | Sauer ......................... 359/270 |

FOREIGN PATENT DOCUMENTS

| | | |
|---|---|---|
| DE | 2029 645 | 12/1970 |
| EP | 0 358 090 | 3/1990 |
| EP | 0 396 449 | 11/1990 |
| EP | 0 702 423 | 3/1996 |
| EP | 0 882 573 A3 | 12/1998 |
| EP | 0 882 573 A2 | 12/1998 |

* cited by examiner

*Primary Examiner*—Cathy Lam
*Assistant Examiner*—G. Blackwell-Rudasill
(74) *Attorney, Agent, or Firm*—Burns, Doane, Swecker & Mathis, L.L.P.

(57) ABSTRACT

Glazing Panels suitable for vehicle windscreens comprise a solid coloured obscuration band (24) around the perimeter, a fade out band (26) extending inwardly therefrom and a multilayer transparent infra-red reflective and/or absorbing coating (28) have the outer edge of the coating positioned so as to lie within the fade out band (26). The panel reduces reflection caused by the transition between coated and uncoated areas of the glass. The panels may be laminates or bilayers.

19 Claims, 5 Drawing Sheets

GLAZING PANELS

DESCRIPTION

This invention relates to novel glazing panels.

Glazing panels, particularly vehicle glazings and particularly windshields, are commonly secured in position using adhesive. These panels may be flat or curved. The panels may be provided with an opaque band extending around their entire periphery, the purpose of which is to improve the appearance of the windshield by masking the interface between the panel and the vehicle and to shield the adhesive from ultra-violet radiation which might damage its integrity over time. This opaque band, which is termed an obscuration band, generally comprises a solid coloured band extending around the periphery of the panel. Commonly the panels further comprise a fade out band extending inwardly from the inner edge of the obscuration band in which the obscuration is applied in a decorative pattern with anything from 1 to 99% of the surface area of the glass being obscured. The fade out band improves the visual appearance of the panel by avoiding a sharp transition between the solid obscuration band and the clear glass.

Another common feature of the modern vehicle glazing panel is the provision of a multilayer transparent infra-red reflective and/or absorbing coating on the glass in which one or more layers reflect IR and/or solar radiation and thereby reduce the heat energy transmitted through the glazing. These coatings do not normally extend to the outer edge of the panel since they have a tendency to corrode if they do so. U.S. Pat. No. 5,492,750 describes a method of applying such a coating to the surface of a glass which uses a mask to prevent deposition of the coating around the periphery of the glass. The thickness of the mask is such that it leaves a ghosting effect at the peripheral edge of the coating which is stated to be undesirable because it highlights the edge of the coating. Where the extremity of the coating does not overlap the obscuration band the changes in reflectance and transmittance between the coated and the uncoated area of glass is noticeable and can distract the driver's attention. Attempts to remove this distraction by ensuring overlap between the solid portion of the obscuration band and the edge of the coating have been discovered to be less than satisfactory particularly because when viewed from a position where the coating is in the foreground and the obscuration band is in the background the transition between the coated and non-coated areas of the glass is very noticeable, and aesthetically displeasing. This is particularly true when a ghosting effect is present at the peripheral edge of the coating. EPA 0702 423 A1 discloses coated windscreens having a small area of uncoated glass which transmits infra-red radiation. It is suggested that this uncoated area be covered with a layer for absorbing light in order to give a more homogeneous appearance to the windshield.

We have now discovered that the appearance and the optical properties of a glazing panel may be improved by providing that the edge of the coating overlaps the fade out band but does not overlap with the solid portion of the obscuration band.

Thus from one aspect this invention provides a glazing panel having an obscuration band applied to at least one surface thereof any extending around the periphery of the panel, a fade out band extending inwardly therefrom and at least one coating applied to at least one surface thereof wherein the outer extremity of the coating lies within the fade out band. Preferably the entire length of the edge of the coating will lie within the fade out band. However this may not always be possible for example due to the presence of rain sensors which are masked by a solid printed area. In such instances we prefer to position as much of the edge of the coating as is possible within the fade out band and generally to ensure that at least 90% of the edge of the coating lies within the fade out band.

The glazing panel may be a laminated panel or a bilayer panel. Laminated panels comprise two or more sheets of glass bonded together with a suitable resin which is typically polyvinylbutyral (PVB). Bilayer panels comprise a single sheet of glass having a layer of transparent resin bonded to the interior surface. The invention finds particular application where the coating film is in the foreground (viewed from the interior of the vehicle) and the obscuration band is in the background although it is useful where the relative positioning of these two layers is reversed. In a laminated panel the obscuration band will not normally be on the outer surface of the glass and is most commonly applied to the innermost glass surface. The coating is most commonly applied to the underside of the outermost panel of the laminate (often termed surface 2 by application of the convention whereby the outermost surface is termed surface 1 and the subsequent surfaces numbered consecutively thereafter). In a bilayer panel the obscuration band and the coating are normally applied to either the interior surface of the glass panel or the interior face of the resin. The coating, the obscuration band and the fade out band may be applied to a flat glazing panel, to a curved glazing panel or to a flat glazing panel which is then curved.

In both laminates and bilayer panels the coating may be positioned in the resin layer i.e. surrounded by resin and not being in contact with the glass. These panels may be constructed by utilising a resin in which the coating is already positioned either to bond two glass sheets together or to bond to the underside of a single glass sheet. When the coating is surrounded by the resin layer the coating may be deposited onto a transparent polymeric material (e.g. PET) prior to their incorporation in the laminate or bilayer. In this embodiment the polymeric material incorporating the coating is preferably cut to the shape and size so that its extremities lie within the fade out band. In a laminated panel the fade out band will normally be applied to a surface other than surface 1 of the laminate in this embodiment of the invention.

The total width of the solid coloured section of the obscuration band and the fade out band may vary through a wide range say from 5 mm to 300 mm but is typically in the range 10 to 150 mm. The width of the solid obscuration band will be that which is sufficient to provide the desired appearance The fade out band may be designed so as to have a decorative effect and the width and the shape of the band may be varied to provide a particular appearance. The density of the shading within the fade out band may vary within wide limits with anything from 1 to 99% of the surface area of the glass being covered with a solid cover. The density of the colouration within the fade out band may vary across the width of the band e.g. by having a high percentage of the surface coloured in the area adjacent to the solid coloured section of the obscuration band and a decreasing percentage of the surface coloured across the width of the fade out band or the density may remain constant across the fade out band.

The colouration in the fade out band may conveniently take the form of a multiplicity of dots of colour spread across the band. These dots may be of varying sizes (say from 0.001 to 10.00 mm) and varying shapes (for example circular, rectangular, polygonal). The fade out band can also take the form of patterns other than dots for example lines of colour of varying widths running parallel to the obscuration band.

The outer edge of the coating typically a multilayer transparent infra-red reflective coating will preferably overlap the edge of the fade out band by at least 0.1 mm and preferably at least 0.5 mm. The edge will normally stop at least 0.1 mm and preferably at least 0.5 mm short of the inner edge of the solid coloured obscuration band. The coating will preferably overlap the band along the entire periphery of that band.

A wide variety of reflective and/or absorbing coatings are used or have been proposed for use in the art. Any of these may be utilised in the panels of this invention. These coatings may be of complex construction. One typical coating comprises a multilayer stack formed from successive layers of metal oxide, silver, metal, metal oxide, silver, metal, metal oxide, metal oxide wherein the metal oxide is typically zinc oxide and the metal is typically zinc.

The coatings may be applied to the glass using any of the known techniques e.g magnetron sputtering, e-beam evaporation, thermal evaporation, chemical vapour deposition and the like. Typically the area on which the coating is deposited is controlled by masking the substrate or by deleting the coating from selected areas after it has been applied. As a result of some of the methods used the transition from the coated to the uncoated area of the glass may not be sharp. There may be a transition zone at the edge of the coating area which may typically be from 0.001 mm to 2.0 mm wide, depending upon the method used. Where the edge of the coating is defined by a mask this ghosting may be reduced or avoided by using a thinner mask, say one having a thickness less than 200 microns and preferably less than 130 microns. From a second embodiment the invention provides a method of forming a glazing panel having a reflective coating on at least one surface thereof, an obscuration band comprising a solid coloured section at the periphery of the panel and a fade out band extending inwardly therefrom on a surface thereof which comprises applying the coating in a manner such that the outer extremity thereof lies within the fade out band.

Some illustrative embodiments of the invention will now be described by way of example by reference to the accompanying drawings in which:

FIGS. 1 to 9 inclusive are cross sectional views through laminated glazing panels comprising two sheets of glass;

FIGS. 10 to 13 inclusive are cross sectional views through a bilayer glazing panel, and FIG. 14 is a plan view of a glazing panel.

In each of the drawings the same numerals indicate the same or a similar part.

In FIG. 1 the panel comprises an inner glass sheet 10 and an outer glass sheet 12 joined by a polyvinylbutyral (PVB) layer 14. The surfaces of the two sheets 10 and 12 are numbered Surface 1 to Surface 4 inclusive in accordance with the convention of the art. Obscuration band 16 is applied to Surface 4. Fade Out Band 18 extends inwardly from the extremity of Band 16 on Surface 4. Coating 20 is applied to Surface 2. The extreme edge of coating 20 overlaps with the innermost edge of Band 18.

FIG. 2 illustrates an alternative in which Obscuration Band 16 and Fade Out Band 18 are applied to Surface 3 of the panel. Coating 20 is applied to Surface 2. The extremity of Coating 20 overlaps with the innermost edge of the Band 18.

Figure 1:
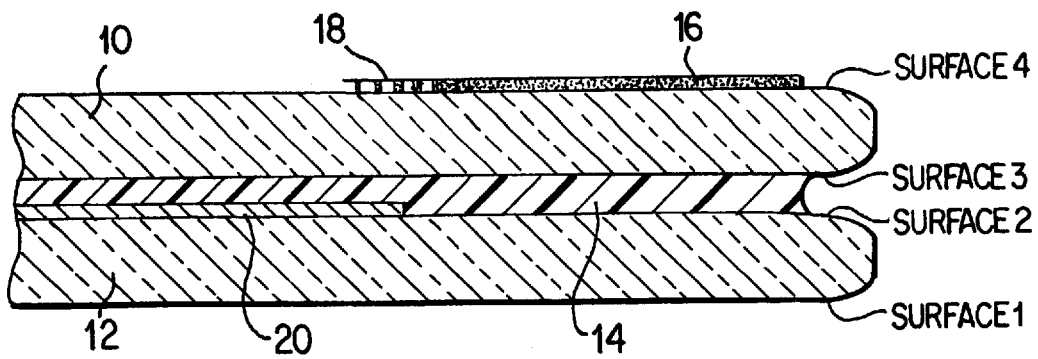
Figure 2:
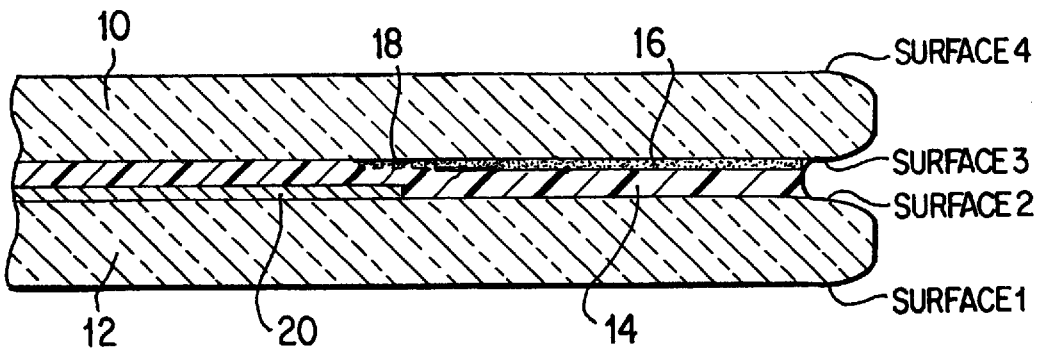
Figure 3:
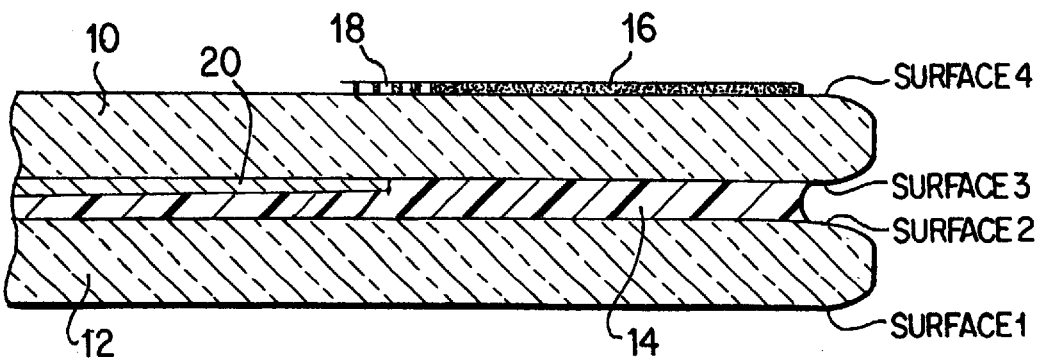
FIG. 3 illustrates a second alternative in which Obscuration Band (16) and Fade Out Band (18) are applied to Surface 4 of the Panel. Coating 20 is applied to Surface 3 of the Panel.
Figure 4:
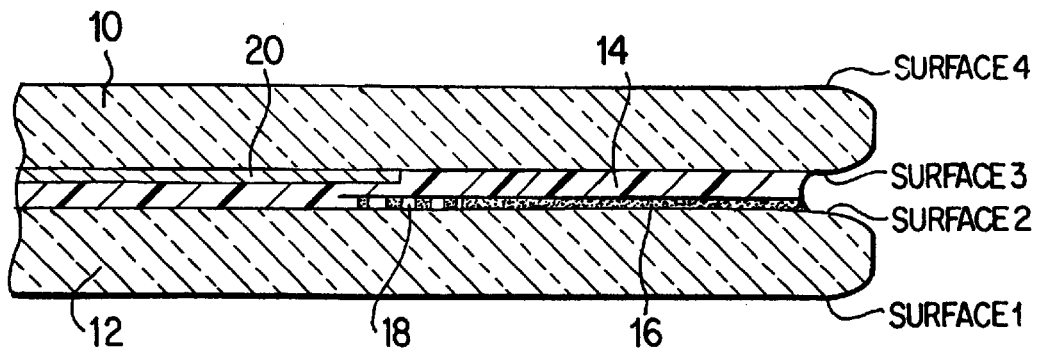
FIG. 4 illustrates another alternative in which Obscuration Band (16) and Fade Out Band (18) are applied to Surface 2 of the Panel and Coating 20 is applied to Surface 3 of the Panel.
Figure 5:
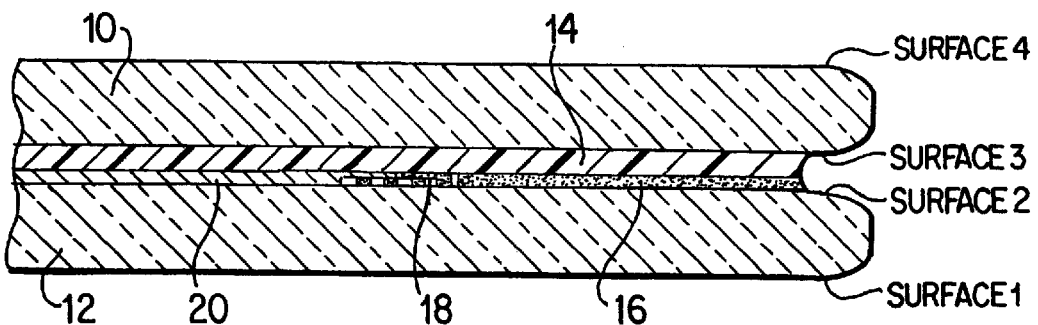
FIG. 5 illustrates another alternative in which Obscuration Band (16) and Fade Out Band (18) are applied to Surface 2 of the Panel and Coating 20 is also applied to Surface 2 in a manner such that the outermost edge of the coating overlaps with the innermost edge of Band 18.
Figure 6:
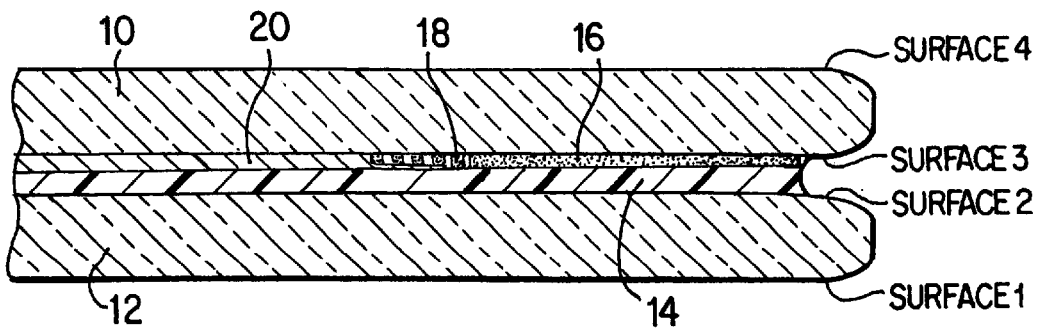
FIG. 6 illustrates a further alternative in which Obscuration Band 16 and Fade Out Band 18 are applied to Surface 3 of the Panel. Coating 20 is also applied to Surface 3, again in such a manner that the outermost edge of Coating 20 overlaps with the innermost edge of Band 18.
Figure 7:
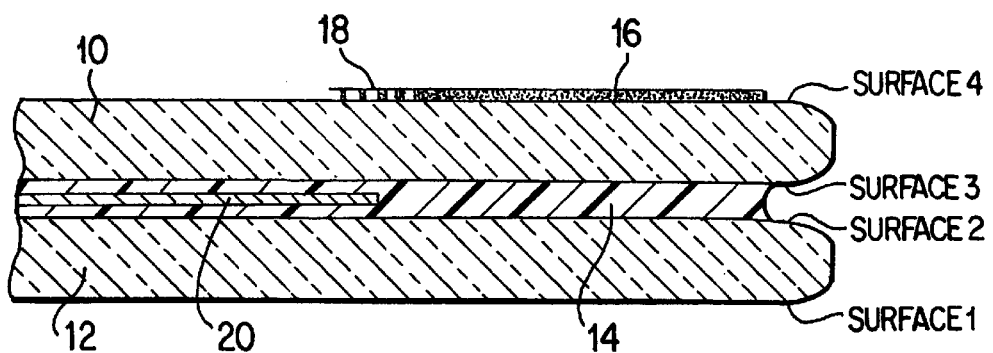
FIG. 7 illustrates a further alternative in which the Obscuration Band (16) and the Fade Out Band (18) are applied to Surface 4 of the Panel. The Coating (20) lies within the PVB 14 between Surface 2 and Surface 3 of the Panel.
Figure 8:
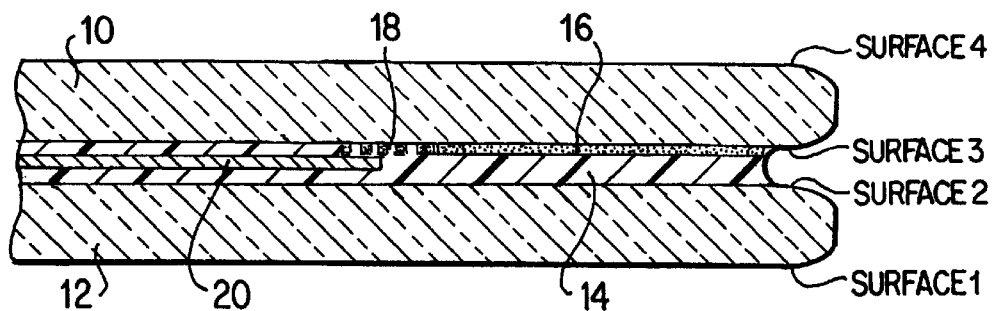
FIG. 8 illustrates a further alternative in which the Obscuration Band 16 and the Fade Out Band 18 are applied to Surface 3 of the Panel. The Coating 20 again lies within the PVB 14 between Surface 2 and Surface 3 of the Panel.
Figure 9:
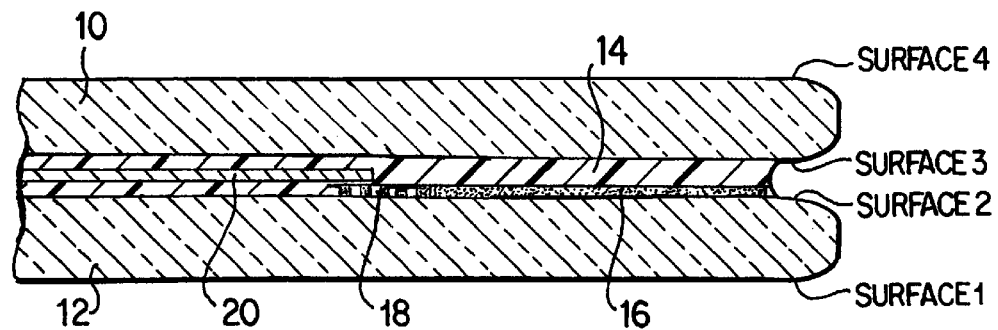
FIG. 9 illustrates a further alternative in which the Obscuration Band 18 and the Fade Out Band 18 are applied to Surface 2 of the Panel. Coating 20 lies within the PVB 14 between Surface 2 and Surface 3 of the Panel.
Figure 10:
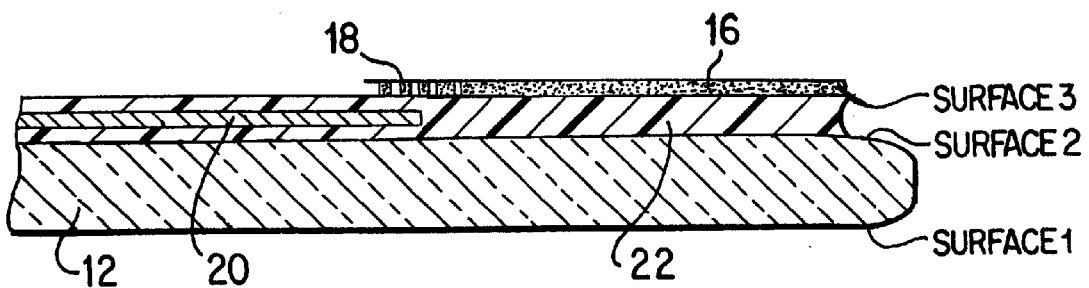

FIG. 10 illustrates a bilayer panel which comprises an outer glass 12 having a Bilayer Material 22 bonded to Surface 2 (the interior surface of outer glass 12). Obscuration Band 16 and Fade Out Band 18 are applied to Surface 3 (the interior surface of Bilayer Material 22). Coating 20 lies within the Bilayer Material 22. The outer extremity of Coating 22 overlaps with the innermost edge of Fade Out Band 18.

Figure 11:
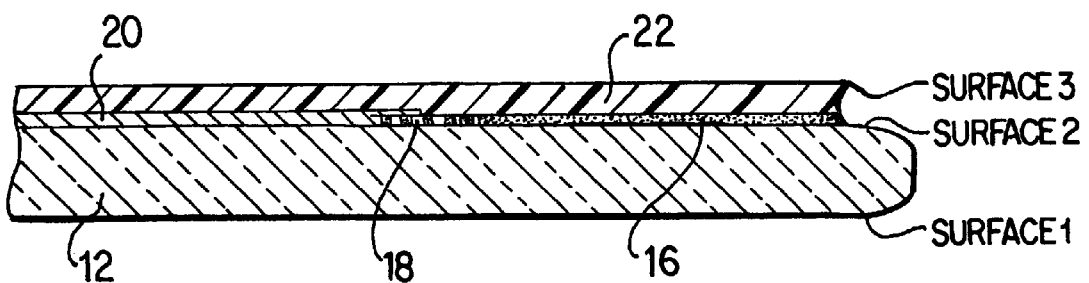

FIG. 11 illustrates an alternative bilayer panel in which the Obscuration Band 16 and the Fade Out Band are applied to Surface 2 of the Panel. Coating 20 is also applied to Surface 2 of the Panel and the outermost extremity of Coating 20 overlaps Fade Out Band 18.

Figure 12:
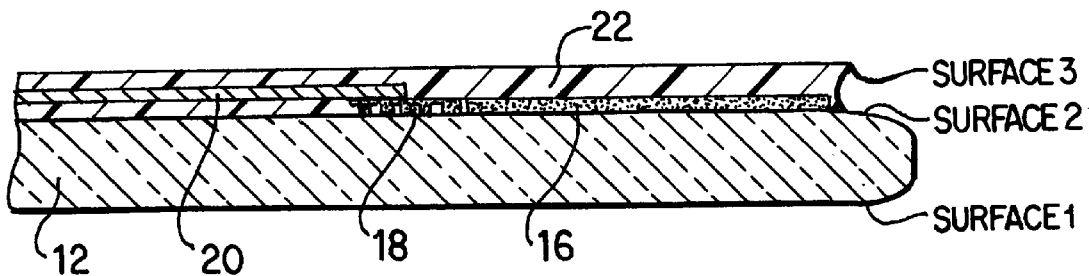

FIG. 12 illustrates an alternative bilayer panel in which the Obscuration Band 16 and the Fade Out Band (18) are applied to Surface 2 of the Panel. The coating 20 lies within the bilayer material 22.

Figure 13:
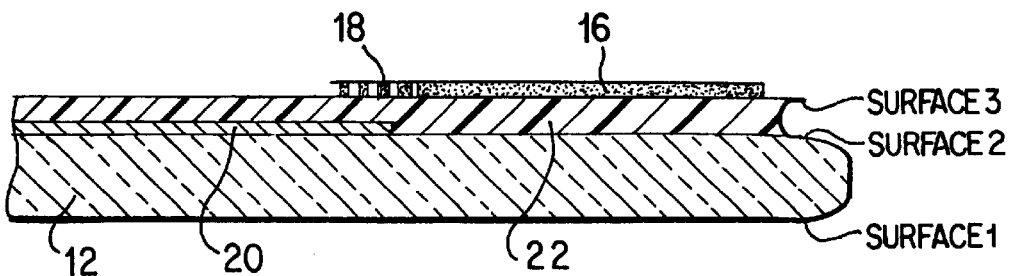

FIG. 13 illustrates a further alternative for a bilayer panel in which Obscuration Band 16 and Fade Out Band 18 are applied to Surface 3 of the Panel. Coating 20 is applied to Surface 2 of the Panel.

Figure 14:
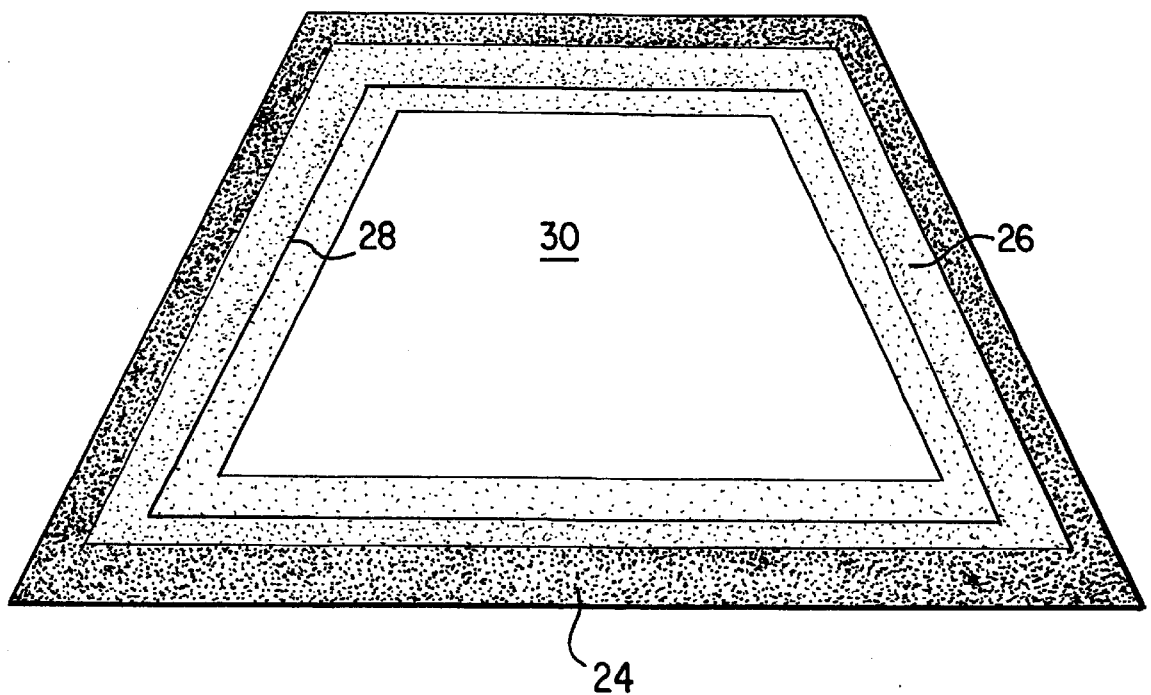

FIG. 14 shows a plan view of a panel with a continuous solid band 24 which represents the solid obscuration band 16. Dot Pattern 26 represents the Fade Out Band 18. Line 28 Extent of Coating represents the outermost extremity of the Coating 20. Non-Obscured Coated Area 30 represents that portion of the coated area which extends beyond the innermost edge of the Dot Pattern 26. Line 28 extends outwardly beyond the innermost edge of Dot Pattern 26 all round the periphery of Dot Pattern 26.

The embodiments of the invention may readily be produced using materials and techniques which are known to the man skilled in the art. Care must be taken to ensure that the extremity of the coating extends beyond the innermost edge of the Fade Out Band if necessary when the glazing panel is assembled from its component parts.

What is claimed is:

1. A glazing panel comprising:
   (i) an obscuration band applied to at least one surface of the glazing panel and extending around the entire periphery of the panel, a fade out band extending inwardly from an inner edge of the obscuration band, and
   (ii) at least one reflective coating layer applied to at least one surface of the glazing panel, wherein the outer extremity of the coating layer lies within the fade out band.

2. A panel according to claim 1 wherein the coating layer is in the foreground and the obscuration band is in the background.

3. A panel according to claim 1 wherein the panel is a bilayer coated panel.

4. A panel according to claim 3 wherein the coating and the obscuration band are applied to the inner face of the panel.

5. A panel according to claim 1 wherein the panel is a laminated panel.

6. A panel according to claim 5 wherein the obscuration band is applied to an interior surface of the laminate.

7. A panel according to claim 5 wherein the coating is applied to an interior surface of the laminate.

8. A panel according to claim 6 wherein the coating is applied to a surface of the glass closer to the outermost surface than the surface to which the obscuration band is applied.

9. A panel according to claim 1 wherein the coating is applied to a transparent polymeric material which is incorporated into a laminated panel and the fade out band is on a surface other than the outermost surface of that laminate.

10. A panel according to claim 1 wherein from 1 to 99% of the surface area of the fade out band is obscured.

11. A panel according to claim 10 wherein the fade out band comprises a pattern of dots having an average size in the range 0.001 mm to 10 mm.

12. A panel according to claim 1 wherein at least 90% of the edge of the coating layer lies within the fade out band.

13. A panel according to claim 12 wherein the entire edge of the coating layer lies within the fade out band.

14. A panel according to claim 1 wherein the outer edge of the coating overlaps the inner edge of the fade out band by at least 0.1 mm.

15. A panel according to claim 1 where in the outer edge of the coating stops at least 0.1 mm short of the inner edge of the obscuration band.

16. A method of forming a glazing panel having a reflective coating on at least one surface of the glazing panel and an obscuration band comprising a solid coloured section at its periphery and a fade out band extending inwardly from an inner edge of the obscuration band on a surface of the glazing panel, the method comprising applying said coating in a manner such that the outer extremity of the coating lies within the fade out band.

17. A method according to claim 16 wherein the coating is applied by physical vapour deposition.

18. A method according to claim 16 wherein the coating is applied to a polymeric transparent material and that polymeric transparent material is subsequently incorporated into a laminated panel.

19. A method according to claim 16 wherein the panel is shaped after the coating has been applied.

* * * * *